US009135819B2

(12) United States Patent
Villa

(10) Patent No.: US 9,135,819 B2
(45) Date of Patent: Sep. 15, 2015

(54) SYSTEM FOR BROADCASTING LOCAL INFORMATION

(75) Inventor: Amanda Lucia Villa, Sitges (ES)

(73) Assignee: Dioptas Holding AG, Zug (CH)

(*) Notice: Subject to any disclaimer, the term of this patent is extended or adjusted under 35 U.S.C. 154(b) by 110 days.

(21) Appl. No.: 12/035,010

(22) Filed: Feb. 21, 2008

(65) Prior Publication Data

US 2008/0204314 A1    Aug. 28, 2008

(30) Foreign Application Priority Data

Feb. 27, 2007    (EP) .................................. 07003993

(51) Int. Cl.
| | |
|---|---|
| G08G 1/0968 | (2006.01) |
| G01C 21/36 | (2006.01) |
| G01S 19/51 | (2010.01) |
| G08G 1/0967 | (2006.01) |
| H04H 20/62 | (2008.01) |

(52) U.S. Cl.
CPC ...... *G08G 1/096822* (2013.01); *G01C 21/3661* (2013.01); *G01S 19/51* (2013.01); *G08G 1/09675* (2013.01); *G08G 1/096783* (2013.01); *G08G 1/096855* (2013.01); *H04H 20/62* (2013.01)

(58) Field of Classification Search
CPC ............ H04W 4/025; G08G 1/096822; G08G 1/096855; G01C 21/3661
USPC ...................... 342/357.09, 357.34; 455/456.3; 340/995.12
See application file for complete search history.

(56) References Cited

U.S. PATENT DOCUMENTS

| | | | | |
|---|---|---|---|---|
| 5,552,989 | A | * | 9/1996 | Bertrand ....................... 701/200 |
| 5,636,245 | A | * | 6/1997 | Ernst et al. .................... 375/259 |
| 5,664,948 | A | * | 9/1997 | Dimitriadis et al. ...... 434/307 R |
| 5,767,795 | A | * | 6/1998 | Schaphorst ................... 340/988 |
| 5,898,680 | A | * | 4/1999 | Johnstone et al. ............ 370/316 |
| 6,021,371 | A | * | 2/2000 | Fultz ............................. 701/467 |
| 6,246,376 | B1 | * | 6/2001 | Bork et al. .................... 343/760 |

(Continued)

FOREIGN PATENT DOCUMENTS

| | | |
|---|---|---|
| WO | WO 98/06080 | 2/1998 |
| WO | WO 00/07392 | 2/2000 |
| WO | WO 01/18983 | 3/2001 |

*Primary Examiner* — Gregory C Issing
(74) *Attorney, Agent, or Firm* — White & Case LLP

(57) ABSTRACT

System for broadcasting local information, related to the area where a vehicle (V), e.g. an automobile, is actually located or moving through, having: a GPS (1) that identifies the area where the vehicle is moving through, a GPRS transmission means (2) for transmitting the said local information from an external, remote station to a CPU (3) located in the vehicle and for managing the information related to the data from the positioning system and the local information. The system has a storage device (4, 5) for the local information, located within the vehicle, and an FM broadcasting device (6), also located within the vehicle, adapted to broadcast the said local information to a reproducing means (7), that can be the radio system of an automobile. The said local information is selected from the stored information in the storage device (4, 5), according at least to the identified area and is updated, on a time basis, with local information emitted from an external updating emitter. As the local information is updated on the information means on a time basis (not necessarily periodically), the system allows obviating the need for 1) streaming information in a continuous manner; and 2) having a whole network at disposal, which prejudices the efficiency and the perceived quality of the service.

19 Claims, 1 Drawing Sheet

(56) References Cited

U.S. PATENT DOCUMENTS

| | | | |
|---|---|---|---|
| 6,266,614 B1* | 7/2001 | Alumbaugh | 701/211 |
| 6,501,421 B1* | 12/2002 | Dutta et al. | 342/357.22 |
| 6,785,551 B1* | 8/2004 | Richard | 455/456.1 |
| 6,816,782 B1* | 11/2004 | Walters et al. | 701/426 |
| 6,901,329 B2* | 5/2005 | Burg et al. | 701/200 |
| 2002/0011951 A1* | 1/2002 | Pepin et al. | 342/357.13 |
| 2002/0019696 A1* | 2/2002 | Kruse | 701/207 |
| 2002/0155844 A1* | 10/2002 | Rankin et al. | 455/456 |
| 2002/0167442 A1* | 11/2002 | Taylor | 342/357.09 |
| 2002/0197955 A1* | 12/2002 | Witkowski et al. | 455/41 |
| 2003/0053378 A1* | 3/2003 | Lovin et al. | 369/7 |
| 2004/0224638 A1 | 11/2004 | Fadell et al. | |
| 2008/0024360 A1* | 1/2008 | Taylor | 342/357.1 |
| 2008/0246652 A1* | 10/2008 | Lewis | 342/357.1 |

* cited by examiner

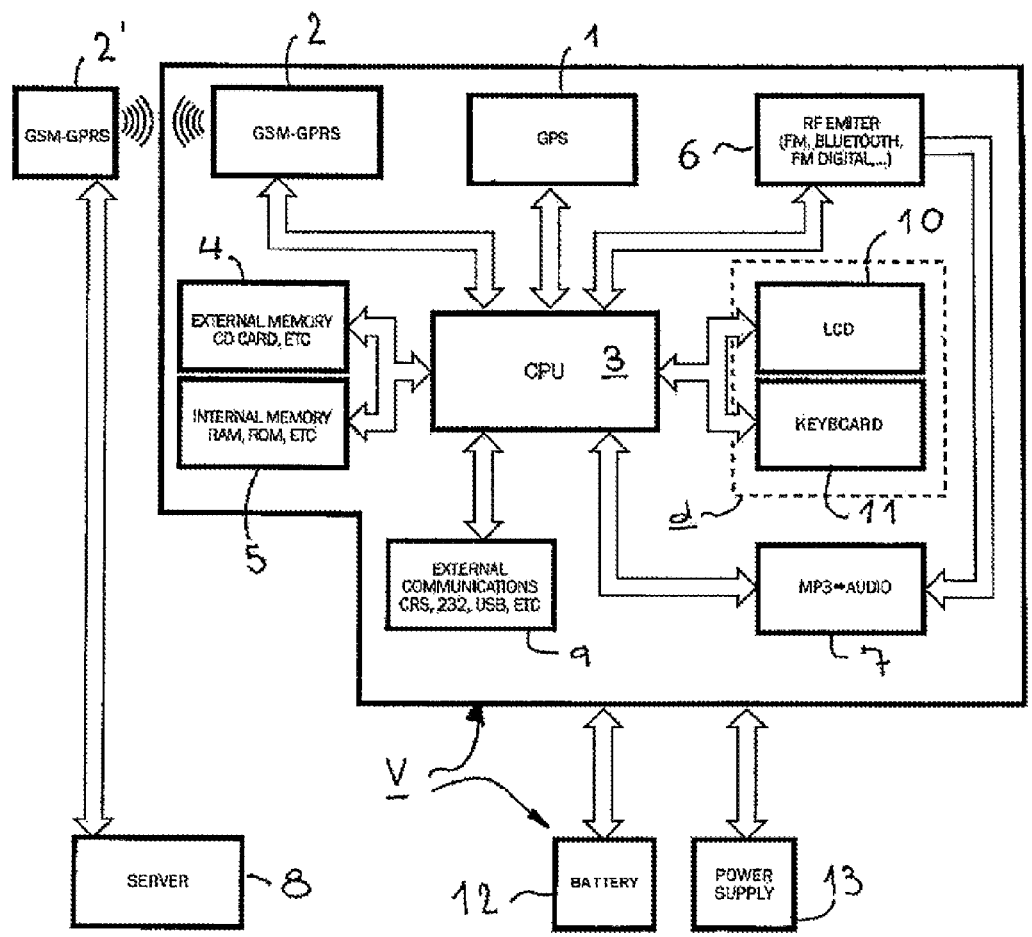

SYSTEM FOR BROADCASTING LOCAL INFORMATION

FIELD OF THE INVENTION

The present invention relates to a system for broadcasting local information, related to the area where a "vehicle", e.g. an automobile, is actually located or moving through, the system having:
- a positioning system, e.g. a GPS system, that identifies the area where the vehicle is moving through,
- a transmission means, e.g. a GPRS, for transmitting the said local information from an external, remote station to an information receiving and delivering means located within the "vehicle".

BACKGROUND OF THE INVENTION

Systems for broadcasting information about the area that a mobile object or vehicle (in particular an automobile) is moving through are already known in the art. These known systems are able to identify the area where an automobile is actually in, and to broadcast to the vehicle the information emitted by one or several external, remote senders. The sent information can be related to tourism data, weather, traffic, and so on.

As examples of the prior art, the following patents or patent applications are cited:

WO01/18983A1 describes a "Multi-Channel Information Broadcasting System" of this type with an FM Emitter with internal memory and an SD type external expanded memory. It is multilingual and has LAN and wireless connections, but it does not suggest any positioning system device.

EP1036475, entitled "Discrimination Of Broadcast Information Depending On Location Of Receiver", describes a system of this type, with the use of a GPS positioning system oriented to a tourism automobile. Data and information are received via Radio Frequency (RF). Information to be received is selectable by a keyboard.

EP1212740 discloses a "Portable Device Supplying Tourist Information" with some variations with respect the above patents, but it does not describe nor suggest short distance FM emission. It is described that the information resident in memory is "tele-chargeable" (GSM-GPRS). The differential value is RF emission.

The USA patent publication US20050181807 describes "Geographical Web Browser, Methods, Apparatus And Systems" and discloses reception of information related to a geographical area by means of web pages. It integrates GPS, mobile tech. and RF reception. It works on a server that establishes what information is to be transmitted.

Korean patent application KR2085747, entitled, "Real-Time/On-Demand Tourist Broadcast System Using Mobile Terminal" describes an interactive broadcasting casting based on an information provider.

As the closest prior art, CN1350373 ("Portable Automatic Tourist Guide Playback Device And Method") can be cited, which describes a portable automatic playing device for a tourist guiding and automatic replaying method, which comprises: a GPS receiver for receiving information about the geographical coordinates corresponding to the scenic spots; a common information receiver for receiving common information about the scenic spot; a central control unit for receiving and processing information about the geographical coordinates of the scenic spots and common service information; an audio circuit for storing the scenic spot coordinate codes and the scenic spot introduction codes and replaying to the tourists.

In general, the cited documents can have a good performance and functionality, but all of them have a first drawback in that a broadcasting external system must be at the disposal of the system and users thereof at all times, this being time and resources consuming, and therefore expensive and lacking efficiency. A second drawback is that, in general, the broadcasted area-related information is "streamed" on a continuous manner, thus also affecting costs. Besides that, a repetitive, streamed message can be boring, thus influencing negatively on the perceived quality of the service.

The goal of the present invention is to provide a whole solution to all of the aforesaid drawbacks.

SUMMARY OF THE INVENTION

To this end, the present invention discloses a system for broadcasting local information, related to the area where a vehicle, e.g. an automobile, is actually located or moving through, of the type described herein that is essentially characterised in that the system also comprises:
- computing means in the vehicle, for managing the information related to the data from the positioning system and the local information,
- a storage device (a memory, RAM, EEPROM, . . . ) for the local information, located within the vehicle, and
- a broadcasting device, also located within the vehicle, adapted to broadcast the said local information to a reproducing means, the said local information being selected from the stored information on the storage device, according at least to the identified area,
- the local information to be stored in the storage device being updated, on a time basis, with local information emitted from an external updating emitter.

Preferred embodiments of the system are also described.

As the skilled person will notice, the information is updated on the information means on a time basis (not necessarily periodically), thus obviating the need for 1) streaming information in a continuous manner; and 2) having a whole network at disposal, which can be a time consuming step, in prejudice of efficiency and the quality of the service perceived by the user.

BRIEF DESCRIPTION OF THE DRAWINGS

The embodiments of the present invention will be described in conjunction with the accompanying drawings, wherein FIG. 1 is a schematic block diagram of the system of the invention, illustrating its constitution and operation.

DETAILED DESCRIPTION OF THE PREFERRED EMBODIMENT

In what follows an embodiment of the system of the invention will be explained in connection with its use in an automobile V, but it must be understood that any other "vehicle" can be applied instead, e.g. a cellular phone, a train, and any other "vehicle" susceptible to incorporate the devices cited here below. Thus, the words "automobile", "car" or "vehicle" can be indistinctly used in the present description to design the referred element, in general, a vehicle V. A "vehicle" will be assumed to be "a means of carrying or transporting something" (according to Merriam-Webster Dictionary available on the internet).

The system of the invention is devised to provide to the user of the automobile information relating to the geographical area where the user is moving through or is about to enter. Preferably, the area-related information will be broadcasted by the reproducing means 7, e.g. the loudspeakers of the radio system 7 of the car V. Of course, the information the user will listen to will not be restricted to such area-related information, but can also be music from the cassette or CD or DVD of the car, and other radio audio emitted by local radio stations.

To that end, the vehicle V is provided with information receiving and delivering means located within the vehicle, having a receiving means 2, e.g. a GPRS, for receiving the said local information from an external, remote station, and computing means 3-7 to be described hereinafter.

In FIG. 1 it can be seen that the system of the invention is constituted by a first group of components installed within a car V and a second group of components external to the car V. In the first group of components installed within a car V, for instance inside the boot, there can be found at least:

a CPU 3 acting as computing means for managing the information being processed;

a memory or storage device 4 and 5 for the local information;

a GPS positioning system 1 for receiving the coordinates of the actual position (x, y, z, t);

a receiver 2 of a GSM-GPRS or of an equivalent mobile communications system;

a broadcasting device 6, adapted to transmit the said local information to the said reproducing means 7; and the said reproducing means 7, receiving the information transmitted by the broadcasting device 6.

An external communications port 9 can be provided, e.g. a CRS, RS232, USB and equivalent, and can be installed inside the car V.

The reproducing mean are preferably equipped with a keyboard 11 and a LCD display device 10, arranged on the dashboard d of the automobile V.

In the said second group of components external to the car V, an emitter 2' for the GSM-GPRS system and a server 8 can be seen. This server 8 and the GPRS emitter 2' are independent of the car V and can be common to a number of cars V using the system. The server 8 can include an FTP or equivalent file transference protocol.

According to the invention, the server 8 communicates with the CPU 3 via the GSM-GPRS System 2, 2'. Nevertheless, the server 8 can also be connected to the CPU 3 through the said external communications port 9, which can be a standard port, susceptible of receiving the connection of any other device.

The system is also provided in the car V with a battery 12 or a power supply 13 for feeding the system with the necessary electric energy to operate. The battery 12 or power supply 13 can be embodied by the same battery of the car V.

The operation of the system is now described in connection with FIG. 1. It must be understood that the flux arrows in FIG. 1 are merely intended to mean "bus connections" or paths of information, and the arrows do not necessarily mean a sense of the streamed information.

On a time basis, for example once a day, or once a week, the server 8 commands the GSM-GPRS emitter 2', defining an "external updating emitter", to send the receiver 2 packs of local information codified and classified according to X, Y, Z GPS coordinates of the information in each pack. This information can be arranged, for instance as indexed files of MP3 or otherwise classified audible information. Next, the sent information is sent by the CPU 3 from the GSM-GPRS receiver 2, to the storage device. The storage device can be an external memory card 4, e.g. a CD card, USB device, etc., or an internal memory 5. It can be an EEPROM, a Flash RAM, etc.

In the operational mode of the system, the GPS system 1 detects the present and actual GPS coordinates where the car V is moving through, and sends the detected coordinates to the CPU 3, with "pointers" to the pack of local information located in the storage device 4, 5 that includes the local information related to the detected coordinates.

Every time it is desired, needed or programmed, the CPU 3 sends a signal to the broadcasting device 6, including the present and actual information, and an order for broadcasting this information to the reproducing means 7, e.g. the radio system of the car, for the information to be issued by the loudspeakers. The broadcasting device can be implemented by a RF emitter station within the car V, and will preferably be embodied by a FM emitter. It also can be a Bluetooth transmitter, an InfraRed (IR) transmitter, a digital FM transmitter or any present or future equivalent communications system for digital signals, e.g. MP3 codified signals.

The system is capable of identifying a new area that the vehicle V is going to or about to enter. To do so, the system comprises means that foresee or calculate, in function of the speed of the car V and the map of GPS coordinates, the next geographical area that has different information to be broadcasted and the remaining time to enter the said next geographical area.

The system for broadcasting local information of the invention has also means for switching the local information to the information of the new area just after the vehicle V has crossed the border between the old area and the new area. This can be performed simply by ordering the CPU 3 to switch the "pointer" to aim to the new pack of information stored within the storage device 4 or 5.

Preferably, the system has also software operated means for playing prerecorded information related to the last geographic position until it again receives positioning signals.

The local information stored in the storage device 4, 5 is classified in at least two categories and three levels of information, the broadcasted local information being selected also on a category basis. Three categories can be tourist related information, traffic related information and weather related information.

The three minimum levels of information to be considered are:

1) related to the area (state, province, county, city, village, . . . );
2) related to the point (street, country site, city quarter, spot, . . . ); and
3) time-related (theatre shows on, local festivities on, professional conferences on . . . )

While the system has been described related to an automobile V, it must be understood that the vehicle of the invention can be embodied by a mobile phone, which will be provided with all the essential features of the claimed invention. In this sense, the system could be implemented on a PDA device as a vehicle V or on any other present or future device, that can be understood as a vehicle V, and capable to incorporate the system.

The present invention relates to the management of local information, but this fact does not prejudice that in case of special application or market needs, it is also possible to reproduce information or data (such as music or recommendations) which is programmed but does not necessarily refer to the place where the mobile object is located.

We have to take into account that the system is "intelligent" and it knows what the route was and the direction that we are following in order to provide us with different information when we return, and the system remembers where it stopped within the sequence of the area-related information.

Logically, depending on the evolution of the product/software, it could be also a mobile phone/PDA/Laptop application or any other device enabled to support this kind of service and information.

In summary, the system of the present invention allows for information to be updated on the information means on a time basis (not necessarily periodically), thus obviating the need for 1) streaming information in a continuous manner; and 2) having a whole network at disposal, which can be a time consuming step, in prejudice of efficiency and the felt quality of the service.

The invention claimed is:

1. A system for accessing and providing local information to a user relating to an area where a vehicle is actually located or moving through, the system comprising first and second groups of components, wherein:
   A. the first group of components is located inside the vehicle and comprises:
      a receiver configured to receive local information from an emitter;
      a storage device configured to store local information received from the emitter about where the vehicle is located, wherein the local information is updated on a recurrent time basis with local information received from the emitter;
      a GPS positioning system configured to identify the current geographic area where the vehicle is located or moving through;
      a processor configured to:
         manage data being processed;
         select local information from the storage device relating to the current geographic area where the user is moving through;
         determine, in terms of the speed of the vehicle and a map of GPS coordinates, the location of the subsequent geographic area and the remaining time to enter the subsequent geographic area; and
         switch local information in the storage device relating to the current geographic area to local information relating to a subsequent geographic area that has different information to be transmitted to the user, as a function of the determined location of the subsequent geographic area and the remaining time to enter the subsequent geographic area; and
      a broadcasting device which receives a signal comprising selected local information from the processor and transmits the signal to a reproducing device as an audio signal; and
   B. the second group of components is located externally to the vehicle and comprises:
      a server which is in communications with the processor and which selects local information that is to be transmitted to the receiver; and
      the emitter which communicates with the server and which transfers to the receiver packs of local information codified and classified according to X, Y, Z GPS coordinates.

2. The system according to claim 1, wherein the vehicle is an automobile.

3. The system according to claim 1, wherein the signal is an RF, FM, FM Digital, Bluetooth, or IR signal.

4. The system according to claim 1, wherein the broadcasting device transmits the signal to the reproducing device.

5. The system according to claim 2, wherein the reproducing device is a radio system of the automobile.

6. The system according to claim 1, wherein the system identifies a new area that the vehicle is going to or about to enter.

7. The system according to claim 1, wherein the system plays information related to the current geographic area until the system receives new positioning signals.

8. The system according to claim 1, wherein the local information stored in the storage device is classified in at least two categories, and the local information is selected on a category basis.

9. The system according to claim 1, wherein the categories are selected from the group consisting of tourist-related information, traffic-related information, and weather-related information.

10. The system according to claim 1, wherein the local information stored in the storage device is classified in at least three levels, and the broadcasted local information is selected on a level basis selected from the group consisting of area-related level, point-related level and time-related level.

11. A method for providing and accessing local information to a user related to an area where a vehicle is actually located or moving through, the method comprising the steps of:
   (a) providing inside the vehicle a first group of components comprising:
      a receiver configured to receive local information from an emitter;
      a storage device configured to store local information received from the emitter about where the vehicle is located, wherein the local information is updated on a recurrent time basis with local information received from the emitter;
      a GPS positioning system configured to identify the current geographic area where the vehicle is located or moving through;
      a processor configured to:
         manage data being processed;
         select local information from the storage device relating to the current geographic area where the user is moving through;
         determine, in terms of the speed of the vehicle and a map of GPS coordinates, the location of the subsequent geographic area and the remaining time to enter the subsequent geographic area; and
         switch local information in the storage device relating to the current geographic area to local information relating to a subsequent geographic area that has different information to be transmitted to the user, as a function of the determined location of the subsequent geographic area and the remaining time to enter the subsequent geographic area; and
      a broadcasting device which receives a signal comprising selected local information from the processor and transmits the signal to a reproducing device as an audio signal;
   (b) providing a link from the first group of components to a second group of components which is located externally to the vehicle and which comprises:
      a server which is in communications with the processor and which selects local information that is to be transmitted to the receiver; and
      the emitter which communicates with the server and which transfers to the receiver packs of local information codified and classified according to X, Y, Z GPS coordinates;

(c) using the speed of the vehicle and a map of GPS coordinates, determining whether the vehicle is moving through the current geographic area or is about to enter the subsequent geographical area;
(d1) if the vehicle is moving through the current geographical area, retrieving, from the storage device, local information relating to the current geographical area;
(d2) if the vehicle is about to enter a subsequent geographical area, determining the remaining time to enter the subsequent geographical area and retrieving, from the storage device, local information relating to the subsequent geographical area;
(e) broadcasting retrieved local information to the user on the reproducing device located in the vehicle; and
(f) updating the local information stored on the storage device on a time basis with local information received from the emitter.

12. The method according to claim 11, wherein the vehicle is a motor vehicle.

13. The method according to claim 11, wherein the signal is an RF, FM, FM Digital, Bluetooth, or IR signal.

14. The method according to claim 11, wherein the broadcasting device transmits the signal to the reproducing device.

15. The method according to claim 12, wherein the reproducing device is a radio system of the automobile.

16. The method according to claim 11, wherein the system identifies a new area that the vehicle is going to or about to enter.

17. The method according to claim 11, wherein the system plays information related to the current geographic area until the system receives new positioning signals.

18. The method according to claim 11, wherein the local information stored in the storage device is classified in at least two categories, and the local information is selected on a category basis.

19. The method according to claim 11, wherein the local information stored in the storage device is classified in at least three levels, and the broadcasted local information is selected on a level basis selected from the group consisting of area-related level, point-related level and time-related level.

* * * * *